May 6, 1958 L. R. FOSTER 2,833,052
PUNCH
Filed Feb. 23, 1956
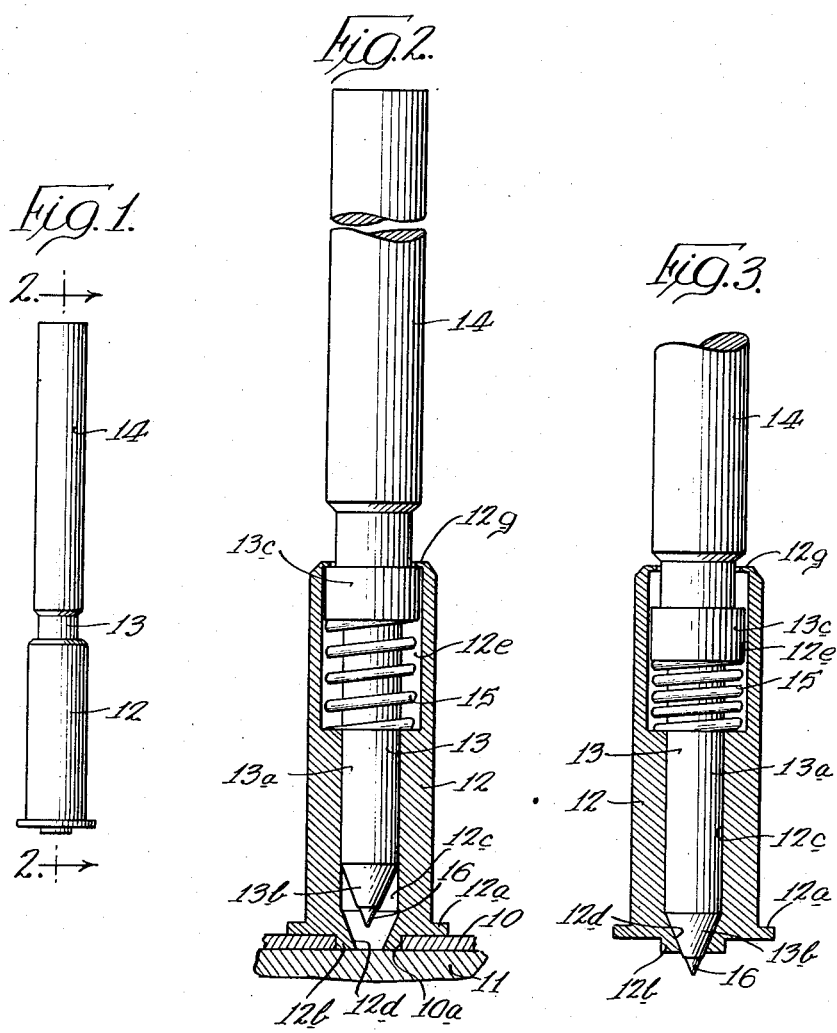
INVENTOR.
Lee R. Foster
BY Schroeder, Hofgren,
Brady & Wegner.
Attys.

United States Patent Office 2,833,052
Patented May 6, 1958

2,833,052

PUNCH

Lee R. Foster, Berwyn, Ill.

Application February 23, 1956, Serial No. 567,127

1 Claim. (Cl. 33—189)

This invention relates to a marking device for marking the centers of template pattern holes on an underlying work piece.

In marking a pattern on a work piece such as a sheet of material to be cut to this pattern, it is customary practice to use a template having holes or openings for inscribing the pattern on the work piece. These holes include circular holes for marking the centers of various holes, arcs, and other details on the work piece preparatory to shaping the work piece to match the pattern.

In marking these centers, it is necessary to locate the exact center of the template pattern hole and make a mark on the work piece according to this exact center. This is ordinarily quite difficult as the exact center of the hole must first be located and then this used to mark the underlying work piece.

With the marking device of this invention, it is quite easy to mark these centers on the work piece in a simple, rapid operation that marks the exact center of the template opening.

One of the objects of this invention, therefore, is to provide an improved marking device for marking such centers.

Another object is to provide an improved marking device of this nature comprising a housing, a marking member movably carried by the housing and adapted to be projected into a template hole for contacting an underlying work piece, and means on the device engaging the template for automatically centering the member relative to the hole.

Other objects and advantages of the invention will be apparent from a description of one embodiment thereof as shown in the accompanying drawings. Of the drawings:

Figure 1 is a side elevational view of a marking device embodying the invention;

Figure 2 is a sectional view through the device taken substantially along line 2—2 of Figure 1 but enlarged for clarity of illustration and showing the marking device in position over a template hole and against an underlying work piece; and Figure 3 is a view of the marking device similar to Figure 1 but showing the parts of the device in another position.

The marking device of this invention is adapted to be used with a template 10 provided with a plurality of template pattern holes 10a, with the template being adapted to overlie a work piece 11, such as a piece of sheet steel. The template holes illustrated at 10a are used in marking the centers of a portion of the pattern.

The marking device of this invention is intended to be used to mark the exact centers of each hole 10a on the underlying work piece 11. In the embodiment illustrated, the marking device comprises a housing 12 of generally cylindrical shape adapted to be placed over the template hole 10a. Means are provided for centering the housing relative to the hole and a marking member 13 is movably carried by the housing and arranged to be projected into the template hole 10a for contacting the underlying work piece 11. The device also provides means for centering the marking member relative to the housing so that it will thus be centered relative to the opening 10a.

In the embodiment shown, the housing 12 is a metal member of generally cylindrical shape provided with a flat base having an outwardly projecting flange 12a. This base is adapted to be positioned in contact with the template 10 to cover the hole 10a. In order to center the base 12a and thus the housing 12 with respect to the hole, the bottom of the base is provided with a downwardly projecting, substantially annular rim 12b that is adapted to extend into the opening 10a in the manner illustrated in Figure 2. This annular rim 12b has a diameter only slightly less than the hole 10a so that the rim can move easily into and out of the hole.

The housing 12 is provided with an internal chamber 12c that extends upwardly from the annular rim 12b and is substantially concentric thereto. The lower end 12d of this chamber is tapered downwardly and inwardly in the shape of a frustum of an inverted cone. The opposite end of the chamber 12c is provided with an enlarged portion 12e extending through the opposite end of the housing 12.

Positioned within the housing 12 is the marking member 13 shown in the accompanying drawings in the form of a plunger having a cylindrical inner end 13a and a conical lower end 13b. The portions 13a and 13b of the plunger are adapted to fit smoothly within the sections 12c and 12d of the housing chamber, with the conical end 13b fitting snugly within the conical chamber end 12d when the plunger is fully extended to the position in Figure 3.

The extreme upper end of the plunger 13 that is beyond the enlarged portion 12e of the housing 12 is enlarged as indicated at 14 so as to serve as an operating end to the plunger. Positioned within the enlarged portion 12e of the housing chamber 12c is an enlarged collar 13c on the plunger. In order to retain the collar 13c within the chamber 12c, the rim 12g of the chamber is spun over inwardly so that it effectively closes the outer end of the enlarged portion 12e of the housing chamber to engage the collar 13c when the plunger 13 is in its non-operative position.

In order to urge continually the plunger 13 to the non-operative position shown in Figures 1 and 2, there is provided a helical spring 15 around the inner end 13a of the plunger 13 and located within the enlarged portion 12e of the housing chamber 12c with one end of the spring bearing against the bottom surface of this enlarged surface 12e and the other end bearing against the adjacent surface of the collar 13c.

When it is desired to use the marking device of this invention in marking the centers of a template hole on an underlying work piece, the device is placed in position over the hole with the base of the device covering the hole and the circular lower end of the device 13b fitted within the hole, all in the manner as shown in Figure 2. Then the outer operating end 14 of the device is struck with a hammer or other device causing the plunger 13 to move toward the work piece 11 so that the point of the conical end 13b of the plunger will mark the work piece. Because the housing 12 is centered relative to the template hole 10a and because the plunger end 13b is centered relative to the housing 12, the point of contact with the end 13b of the plunger on the work piece 11 will be the exact center of the template opening 10a.

In order to aid in inscribing this center marking, the lower end of the conical portion 13b of the plunger is provided with a hardened tip 16. This serves to mark distinctly the center of the template hole 10a on the work piece 11 even when this work piece is a relatively hard metal such as steel. The tapered plunger end 13b fits snugly in the tapered end 12d of the opening 12c when the plunger is fully extended as shown in Figure 3. This close fit aids in centering the plunger relative to the housing 12 and thus to the template opening 10a.

Having described my invention as related to the embodiment shown in the accompanying drawings, it is my intention that the invention be not limited by any of the details of description, unless otherwise specified, but rather be construed broadly within its spirit and scope as set out in the accompanying claim.

I claim:

A marking device for marking the centers of template pattern holes on an underlying work piece, comprising: a housing having a chamber therein with a central bore of circular cross section tapering at its lower end; a base portion on the bottom of said housing adapted to be placed over said hole; a centering projection of annular shape extending from said base adapted to engage the sides of the template defining the hole and fit snugly therein for positioning the base and thus the housing centrally relative to the template hole, the base and projection having a tapered opening therethrough arranged to communicate and cooperate with the chamber and its tapered end; a marking member having a generally conically shaped lower end movably mounted in said chamber and adapted to be substantially centered relative to said housing by the entrance of said conically shaped lower end into the tapered chamber, base and projection as said member is projected through said opening into contact with said underlying work piece; and a spring within said housing engaging a portion of the housing and a portion of the marking member for urging said marking member into retracted position.

References Cited in the file of this patent
UNITED STATES PATENTS

| | | |
|---|---|---|
| 804,795 | Cummings | Nov. 14, 1905 |
| 837,690 | Labunski | Dec. 4, 1906 |
| 1,193,676 | Emerson | Aug. 8, 1916 |

FOREIGN PATENTS

| | | |
|---|---|---|
| 181,751 | Germany | Mar. 14, 1907 |